United States Patent [19]
Svensson

[11] Patent Number: 5,948,545
[45] Date of Patent: *Sep. 7, 1999

[54] PROCESS FOR PROTECTING A SURFACE FROM NON-DESIRED CONTAMINATION

[75] Inventor: Sigfrid Svensson, Bryssel, Belgium

[73] Assignee: Polysaccharide Industries AB PSI, Bromma, Sweden

[ * ] Notice: This patent is subject to a terminal disclaimer.

[21] Appl. No.: 09/059,329

[22] Filed: Apr. 14, 1998

Related U.S. Application Data

[62] Division of application No. 08/714,058, filed as application No. PCT/SE95/00307, Mar. 23, 1995, Pat. No. 5,750,189.

[30] Foreign Application Priority Data

Mar. 23, 1994 [SE] Sweden .................................. 9400976

[51] Int. Cl.$^6$ .............................. B65B 33/00; B05D 3/02; B32B 9/04
[52] U.S. Cl. .......................... 428/497; 427/154; 427/156; 427/384; 427/271; 427/287; 427/385.5; 427/388.1; 427/336
[58] Field of Search .................................. 427/154, 156, 427/384, 271, 385.5, 287, 388.1, 336; 428/497

[56] References Cited

U.S. PATENT DOCUMENTS

| | | | |
|---|---|---|---|
| 5,017,237 | 5/1991 | Svensson | 427/154 |
| 5,093,485 | 3/1992 | Svensson | 536/1.1 |
| 5,308,647 | 5/1994 | Lappi | 427/154 |
| 5,395,646 | 3/1995 | Basseres et al. | 427/154 |
| 5,418,006 | 5/1995 | Roth et al. | 427/155 |
| 5,750,189 | 5/1998 | Svensson | 427/154 |

*Primary Examiner*—Janyce Bell
*Attorney, Agent, or Firm*—Burns, Doane, Swecker & Mathis, L.L.P.

[57] ABSTRACT

A process for protecting a surface from non-desired contamination and for facilitating removal of said contamination from said surface, characterized by the steps: a) preparing a solution of polysaccharides containing at least two components, wherein one component is constituted by a first polysaccharide which, when precipitated from a solution by evaporation of the solvent thereof, directly forms a film and wherein the second component is constituted by a second polysaccharide which, when precipitated from a solution by evaporation of the solvent thereof, forms a film via at least partial gel formation, or by interaction with said first polysaccharide, said films being redissolvable or swellable: b) applying the solution from step a) onto said surface before subjected to contamination: c) allowing the applied solution to dry so as to form a solid film on said surface via at least partial gel formation: d) treating the film-coated surface with a liquid capable of redissolving film or provided swelling thereof: and e) removing the non-desired contamination by complete or partial removal of the film from the surface.

33 Claims, No Drawings

5,948,545

PROCESS FOR PROTECTING A SURFACE FROM NON-DESIRED CONTAMINATION

This application is a divisional of 08/714,058 filed Sep. 10, 1996, now U.S. Pat. No. 5,750,189, which is a 371 of PCT/5E 95/00307 filed Mar. 23, 1995.

This application is a divisional of application Ser. No. 08/714,058, filed Sep. 10, 1996, now U.S. Pat. No. 5,750, 189.

The present invention relates to a process for protecting surfaces from non-desired contamination and for facilitating removal of such contamination from the surfaces.

In EP B1 0 365 584 there is described a contamination removal process based on the use of a solution containing a polysaccharide and a solvent therefor for creating a protective coating on a surface. After being subjected to contamination such protective surface can be easily freed from the contamination by treating the coated surface with a liquid which is capable of redissolving the protective coating or providing for swelling thereof. The invention according to said patent specification constitutes an excellent solution to the contamination problem as reflected by contamination resulting from so called graffiti, traffic pollution etc.

The present invention constitutes a significant improvement of the techniques disclosed in EP B1 0 365 584, and the purpose of the present invention is to provide for a polysaccharide film which has low solubility in water of room temperature.

A number of polysaccharides, for example carageenan and agar, which are dissolved in water at an increased temperature form at certain minimum concentrations gels when such solution is cooled to a lower temperature. Continued evaporation of water results in the formation of a film which frequently is resistent to dissolution and can be dissolved or made to swell only at an increased temperature.

The coating of surfaces with polysaccharide solutions at an increased temperature is difficult, and to apply a polysaccharide gel by spraying or the like results in inferior adhesion to the substrate since the solvent is inextricably bound in the gel structure.

The problem to be solved by the instant invention can be said to reside in finding new techniques, whereby it is possible to make use of the advantages associated with gel formation as an intermediate stage while at the same time providing for a concentration of polysaccharides in the solution resulting in a film of sufficient thickness. If a polysaccharide of the gelling type is used alone the concentration thereof in solution has to be very low in order to obtain a solution thereof that can be applied without difficulty. If the concentration is increased to a level which will result in sufficient film thickness then gelling will occur and the application by spraying or the like will constitute a severe problem. The invention solves this problem in a satisfactory way and thereby constitutes a significant advance in the art.

The present invention aims at solving the problem of obtaining a resistant coating or film constituted by polysaccharides while making use of the advantage of gel formation as an intermediary step in the process of obtaining the film.

To this end the invention provides for a process for protecting a surface from non-desired contamination and for facilitating removal of said contamination from the surface, and said process involves the following steps:

a) preparing a solution of polysaccharides containing at least two components, wherein one component is constituted by a first polysaccharide which, when precipitated from a solution by evaporation of the solvent thereof, directly forms a film, and wherein the second component is constituted by a second polysaccharide which, when precipitated from a solution by evaporation of the solvent thereof, forms a film via at least partial gel formation, or by interaction with said first polysaccharide, when precipitated from a solution by evaporation of the solvent thereof, forms a film via at least partial gel formation, said films being redissolvable or swellable;

b) applying the solution from step a) onto said surface before subjected to contamination;

c) allowing the applied solution to dry so as to form a solid film on said surface via at least partial gel formation;

d) treating the film-coated surface with a liquid capable of redissolving film or providing swelling thereof; and e) removing the non-desired contamination by complete or partial removal of the film from the surface.

The process as outlined above resides in principal in proceeding from a polysaccharide solution, to an intermediate gel and to a solid film. This can be accomplished in three different ways.

According to a first aspect of the invention the solution in step a) above is prepared by using as a second polysaccharide one which is capable of forming, when precipitated from a solution thereof by evaporation of the solvent thereof, a film via at least partial gel formation. In this aspect of the invention there may be used as a second polysaccharide one capable of gel formation, and the gel formation of said second polysaccharide is disturbed by the presence of a first polysaccharide which is non-gelling, so that a solution of the two can be obtained at a desirably high concentration without the formation of a gel at a useful temperature, such as room temperature. Upon evaporation of the solvent from such solution there will be formed a gel which is finally converted into a solid film.

According to a second aspect of the invention there is prepared in step a) above a solution, wherein said second polysaccharide is capable of interacting with said first polysaccharide to give the desired result. According to a third aspect of the invention there may be used an admixture of two polysaccharides, of which each alone will not form a gel when precipitated from a solution by evaporation of the solvent thereof, but which together by interaction pass a gel stage at increased concentration and finally form a solid film.

The three different aspects of the invention described above make it possible to form a protective coating of surfaces, wherein the polysaccharide solution upon concentration passes through the gel stage before forming a solid film. The resulting film resists dissolution since treatment with the solvent, such as water, only results in swelling of the film to a gel unless the temperature is increased so that the gel will be dissolved.

In the process according to the present invention the concentration of polysaccharides in the solution prepared in step a) above preferably exceeds about 0.1% (w/v). It is also preferred that said amount is at most about 10% (w/v), particularly at most about 5% (w/v).

The proportions based on weight between said first and second polysaccharides may vary within very broad limits, such as from about 1000:1 to 1:1000 depending on the nature of the compounds.

Said first polysaccharide used in the process according to the invention and which is of the non-gelling type, is preferably selected from celluloses and derivatives thereof, starches and derivatives thereof, plant gums and microbial polysaccharides. Among plant gums there may be mentioned guar gum and Locust bean gum, and among microbial polysaccharides a useful example is dextran.

The second polysaccharide of the type that is gelling alone or gelling by interaction with the first polysaccharide, is preferably selected from microbial polysaccharides and algal polysaccharides, examples being xanthan and agar.

Particularly preferred combinations are plant gums and xanthan or agar. The concentration of the plant gum is preferably within the range about 1 to about 2% by weight, whereas the second polysaccharide is used in a lesser amount, such as from about 0.2 to about 1% by weight for xanthan and from about 0.005 to about 0.05% by weight for agar.

In the combination plant gum and agar the proportion by weight between the two suitably lies within the range about 50:1 to about 300:1. In the combination Guar gum—agar the proportion is preferably between from about 150:1 to about 250:1, whereas said proportion with Locust bean gum is preferably from about 50:1 to about 150:1.

Within the concept of this invention more than two polysaccharides may be used, such as two different non-gelling polysaccharides in addition to one polysaccharide of the second type or vice versa, or both.

According to yet another aspect of the invention the solution under step e) above is preferably provided with a pH buffer for the purpose of counteracting changes in the pH of the film formed independent of exterior influence. This is suitable particularly to withstand the influence of environmental conditions, such as acid rain, bird droppings, and other conditions involving acid or basic pH's.

The invention will in the following be further illustrated by non-limiting examples, wherein percentages are given in weight by volume unless otherwise indicated. These examples illustrate the three main aspects of the present invention as outlined above.

EXAMPLE 1

20 parts by volume of a solution of dissolvable potato starch (Sigma) in water (2%) are admixed at 90° C. with 1 part by volume of a 1% aqueous solution of agar (Sigma). The resulting mixture is cooled to room temperature resulting in a solution of the two polysaccharides.

The resulting solution is applied to a solid substrate (concrete), and upon evaporation of the solvent (to approximately 20% of the original volume) a gel is formed which on further evaporation of solvent forms a solid film. This film is fairly resistant to treatment with cold water (15° C.) but a certain swelling of the surface layer of the film will be obtained. The film is well suited for the protection of surfaces against graffiti type of contamination or air pollution, such contamination being easily removable by washing the film using water of increased temperature and/or pressurized water supplied through a nozzle.

EXAMPLE 2

Example 1 is repeated but with the use of an aqueous solution containing 1.5% Locust bean gum and 0.01% agar. Said solution is applied to a substrate (glass) and forms a solid film via the formation of a gel. To improve adhesion of the solution to the glass substrate the glass can be pretreated by the application of a primer, such as polymin.

EXAMPLE 3

A solution of a mixture of xanthan gum and Locust bean gum in the weight proportions 1:3 is prepared at a total concentration of polysaccharides of 0.3%. The solution is sprayed onto an aluminum substrate in an amount of 0.1 l/m². After about 1 h at 20° C. the applied solution has formed a gel, which after additional 2 h has been converted into a transparent solid film. The properties and behaviour of said film are similar to those of the film of Example 1.

EXAMPLE 4

Example 1 is repeated but in this case there is added to the polysaccharide solution a Sörensen phosphate buffer constituted by a mixture of disodium hydrogen phosphate and potassium dihydrogen phosphate resulting in a pH of the solution of about 7. The resulting film maintains a neutral pH under the influence of acid as well as basic environmental influence, such as acid rain and bird droppings, respectively.

I claim:

1. A process for protecting a surface from contamination and facilitating the removal of contamination therefrom comprising the following steps:
    i) preparing a polysaccharide containing solution which comprises at least two different polysaccharides, a first polysaccharide being one precipitated by evaporation of a solvent in the solution, and a second polysaccharide which by itself is capable of forming a film at least partially via gel formation when precipitated from the solution by evaporation of a solvent contained therein, said film being redissolvable or swellable;
    ii) applying the solution of i) onto a surface which is to be subjected to a source of contamination;
    iii) allowing the applied solution to dry on said surface to produce a solid film on said surface, at least partially via gel formation;
    iv) exposing the surface to a source of potential contamination;
    v) treating the film-coated surface with a liquid capable of redissolving the film or swelling the film; and
    vi) removing non-desired contamination deposited on said surface by complete or partial removal of said film from said surface.

2. The process of claim 1, wherein said second polysaccharide is one capable of interacting with said first polysaccharide.

3. The process according to claim 1, wherein in step i), the amount of polysaccharide in said solution is at least about 0.1% (w/v).

4. The process according to claim 3, wherein the amount of polysaccharide is at most about 10% (w/v).

5. The process according to claim 3, wherein the amount of polysaccharide is at most about 5% (w/v).

6. The process according to claim 1, wherein said first polysaccharide is selected from the group consisting of cellulose, derivatives thereof, starches, derivatives thereof, plant gums and microbial polysaccharides.

7. The process according to claim 1, wherein said first polysaccharide is a plant gum.

8. The process according to claim 7, wherein said plant gum is dextran.

9. The process according to claim 1, wherein said second polysaccharide is an algal polysaccharide.

10. The process according to claim 1, wherein said second polysaccharide is agar.

11. The process according to claim 1, wherein said second polysaccharide is a microbial polysaccharide.

12. The process according to claim 1, wherein said second polysaccharide is xanthan gum.

13. A surface which comprises a film produced according to claim 1.

14. The surface of claim 13, wherein the first polysaccharide is selected from the group consisting of cellulose, derivatives thereof, starches, derivatives thereof, plant gums and microbial polysaccharides.

15. The surface of claim 13, wherein the first polysaccharide is a plant gum.

16. The surface of claim 15, wherein said plant gum is dextran.

17. The surface of claim 13, wherein the second polysaccharide is an algal polysaccharide.

18. The surface according to claim 13, wherein the second polysaccharide is a microbial polysaccharide.

19. A process for protecting a surface from contamination and facilitating the removal of contamination therefrom comprising the following steps:

i) preparing a polysaccharide containing solution which comprises at least two different polysaccharides, a first polysaccharide being one which directly forms a film when precipitated by evaporation of a solvent in the solution, and a second polysaccharide which is capable of forming a film at least partially via gel formation upon interaction with said first polysaccharide upon precipitation by evaporation of a solvent contained therein, said film being redissolvable or swellable;

ii) applying the solution of step i) onto a surface which is to be subjected to a source of contamination;

iii) allowing the applied solution to dry on said surface to produce a solid film on said surface, at least partially via gel formation;

iv) exposing the surface to a source of potential contamination;

v) treating the film-coated surface with a liquid capable of redissolving the film or swelling the film; and vi) removing non-desired contamination deposited on said surface by complete or partial removal of said film from said surface.

20. The process according to claim 19, wherein in step i), the amount of polysaccharide in said solution is at least about 0.1% (w/v).

21. The process according to claim 20, wherein the amount of polysaccharide is at most about 10% (w/v).

22. The process according to claim 20, wherein the amount of polysaccharide is at most about 5% (w/v).

23. The process according to claim 19, wherein said first polysaccharide is selected from the group consisting of cellulose, derivatives thereof, starches, derivatives thereof, plant gums and microbial polysaccharides.

24. The process according to claim 19, wherein said first polysaccharide is a plant gum.

25. The process according to claim 24, wherein said plant gum is dextran.

26. The process according to claim 19, wherein said second polysaccharide is a microbial polysaccharide gum.

27. The process according to claim 19, wherein said second polysaccharide is xanthan gum.

28. A surface which comprises a film produced according to claim 19.

29. The surface of claim 28, wherein the first polysaccharide is selected from the group consisting of cellulose, derivatives thereof, starches, derivatives thereof, plant gums and microbial polysaccharides.

30. The surface of claim 28, wherein the first polysaccharide is a plant gum.

31. The surface of claim 30, wherein said plant gum is dextran.

32. The surface of claim 28, wherein the second polysaccharide is an algal polysaccharide.

33. The surface according to claim 28, wherein the second polysaccharide is a microbial polysaccharide.

* * * * *